INVENTOR.
MELVIN BURRUP.
BY
Willard S. George
ATTORNEY.

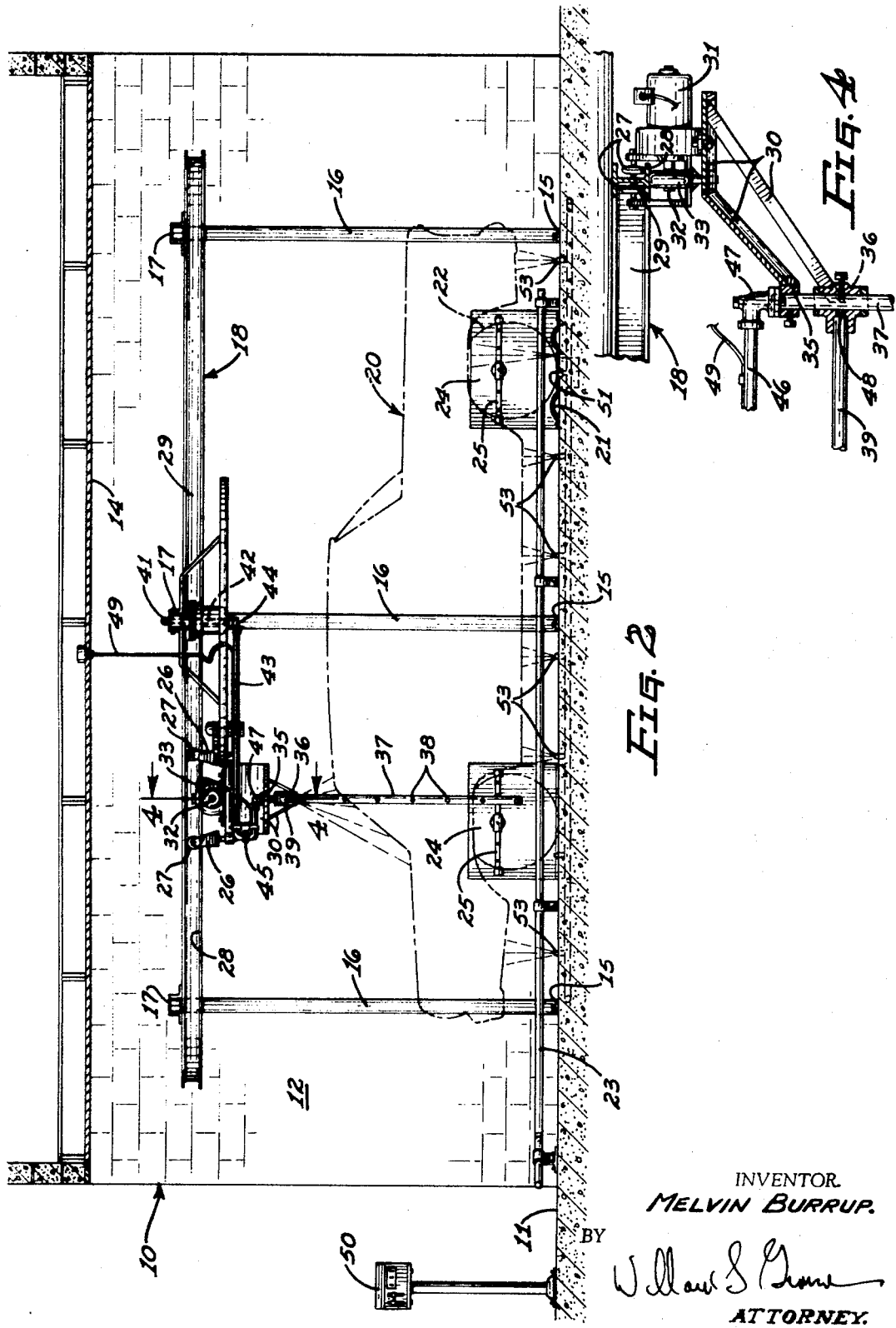

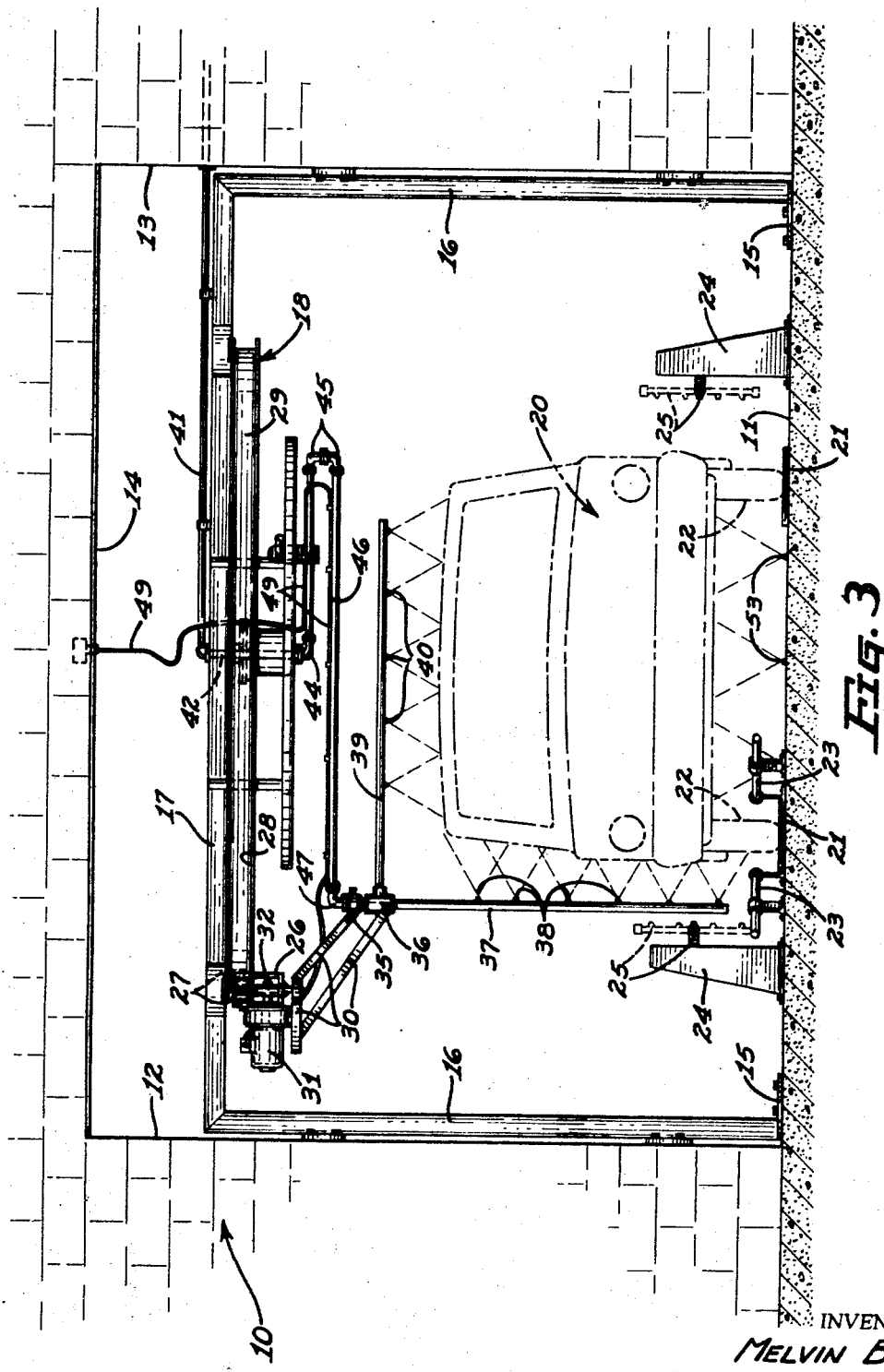

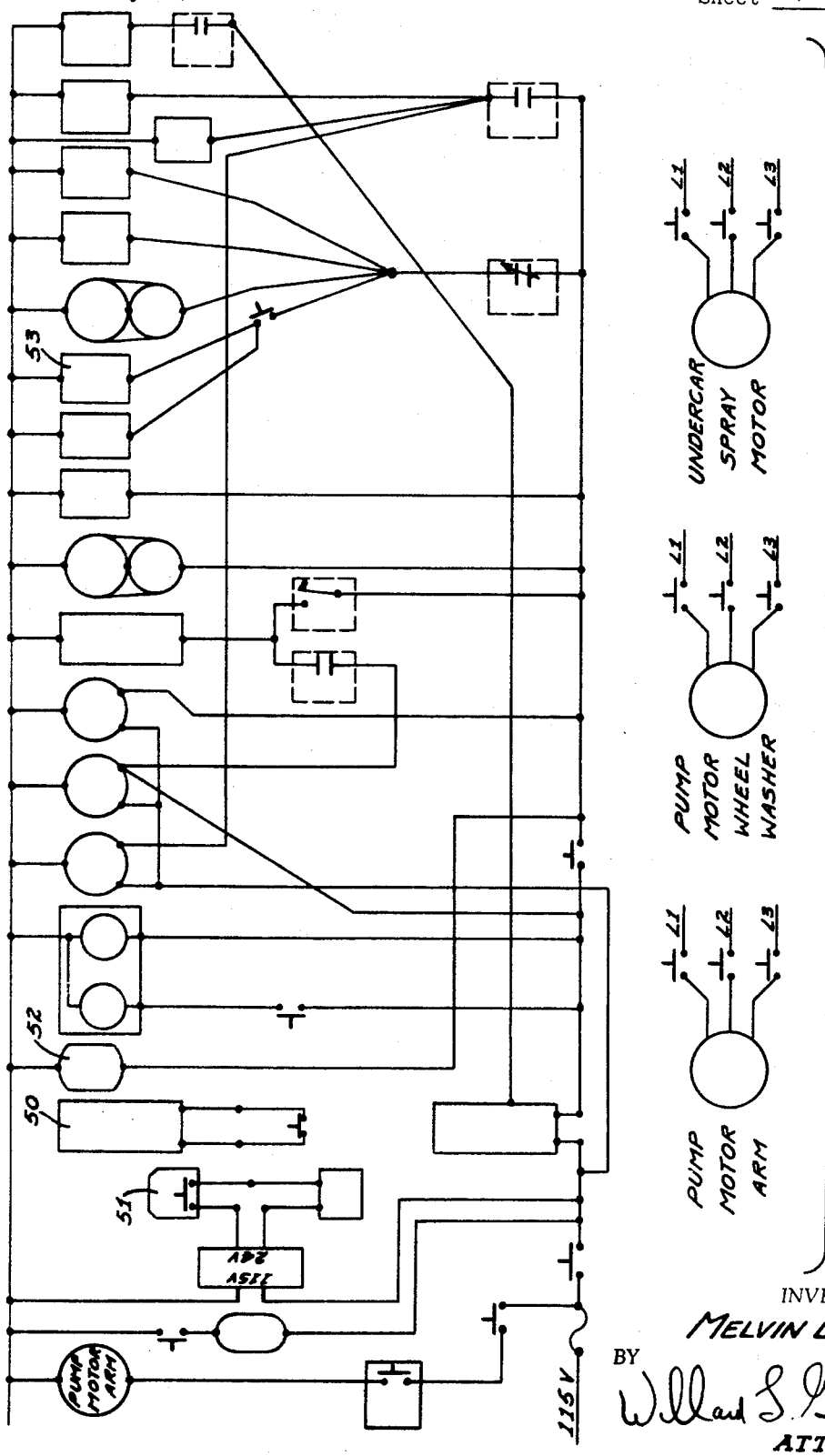

United States Patent Office 3,447,546
Patented June 3, 1969

3,447,546
AUTOMATIC SELF-SERVICE CAR WASHING APPARATUS
Melvin Burrup, Scottsdale, Ariz., assignor, by mesne assignments, to Monorail Car Wash, Inc., a corporation of New York
Filed July 22, 1966, Ser. No. 567,153
Int. Cl. B60s 3/04
U.S. Cl. 134—123                                    3 Claims

---

ABSTRACT OF THE DISCLOSURE

An automatic vehicle washing apparatus in which a carriage is propelled around a generally rectangular overhead track to convey a spray manifold around a vehicle. The spray manifold is in the general shape of an inverted L so that the top and sides of the vehicle are washed simultaneously. Additional spray washers are provided at the wheels to provide fortified washing in the area of wheels.

---

This invention pertains to car washing apparatus and is particularly directed to automatic self-service car washing machines.

One of the objects of this invention is to provide an automatic car washing device and apparatus associated therewith in which the car being washed remains stationary.

Still another object of this invention is to provide an automatic car washing device in which the customer can stay in the car and no attendant is needed during the complete washing operation of the vehicle.

Still another object of this invention is to provide an automatic car washing apparatus which is ideally arranged to fit already existing self-service wash bays.

Still another object of this invention is to provide an automatic car washing device which can wash a volume of cars equal to many times over that of self-service apparatus in which the driver himself must apply the washing materials to the vehicle.

Still another object of this invention is to provide a car wash unit in which a motorized trolley follows a predetermined path to direct cleaning force against the top, sides, front and back of the car in cooperation with further means for scrubbing the wheels of the vehicle while in stationary non-rotating position.

Further features and advantages of this invention will appear from a detailed description of the drawings in which:

FIG. 2 is a side elevation of the apparatus shown partly in section on the line 2—2 of FIG. 1.

FIG. 3 is a rear vertical elevation of the apparatus shown in FIGS. 1 and 2.

FIG. 4 is an enlarged fragmentary sectional view on the line 4—4 of FIG. 2.

FIG. 5 is a circuit diagram for the electrical control of the apparatus.

Figure 1:
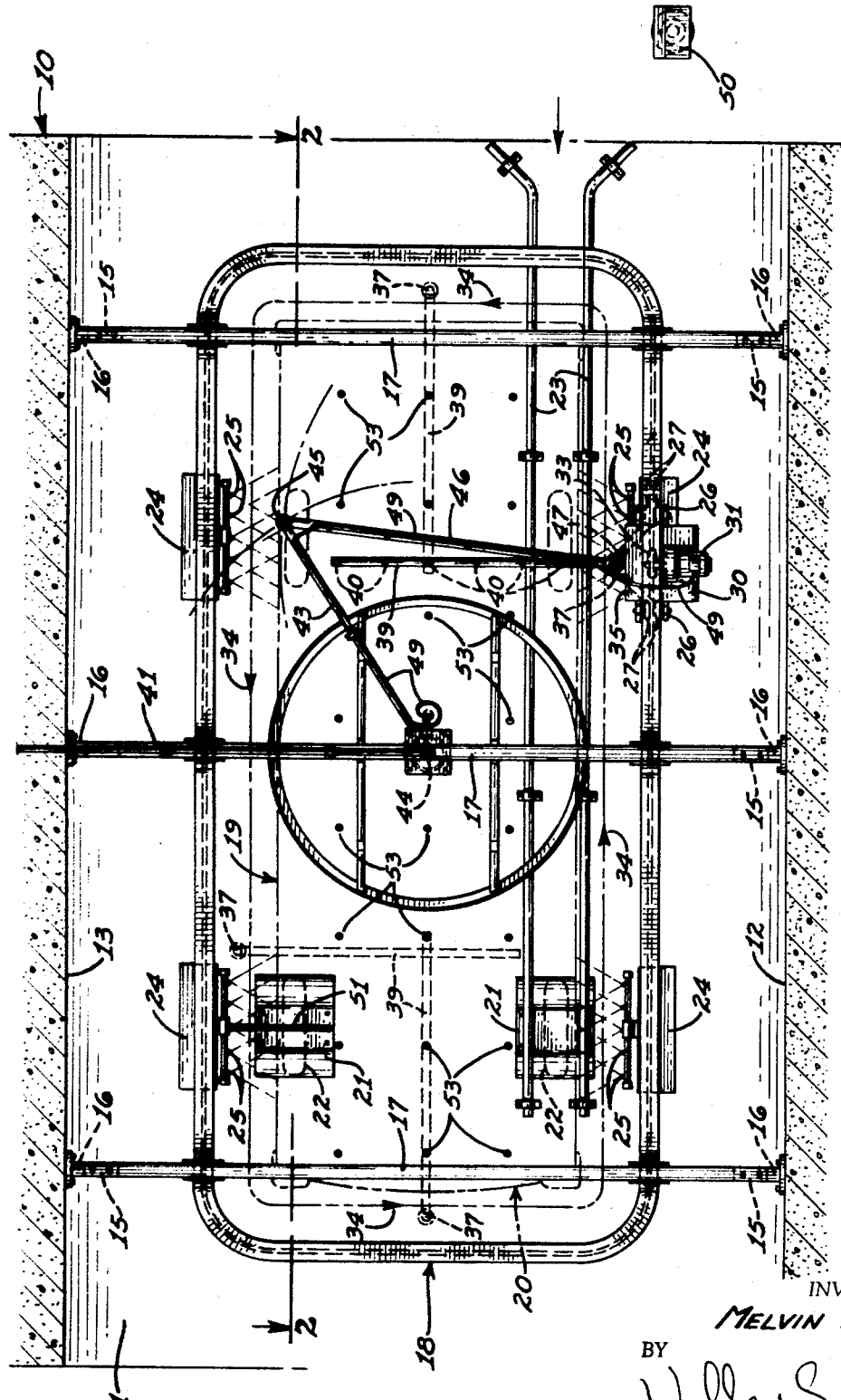
FIG. 1 is a top plan view of the car washing apparatus incorporating the features of this invention.

As an example of one embodiment of this invention there is shown an automatic self-service car washing apparatus in which there preferably is provided a suitable building structure 10 having a floor 11, the side walls 12 and 13 and the ceiling 14. Mounted on suitable plates 15 secured to the floor 11 are the upright columns 16 which may be secured to the walls 12 and 13 if desired. Laterally disposed tie members 17 interconnect rigidly the tops of the columns 16. A horizontally disposed endless track 18 having the general configuraton 19 of the vehicle 20 to be washed is rigidly secured to the underside surfaces of the transverse tie members 17. On the floor 11 are provided wheel engaging positioning plates 21 arranged to engage the front tires 22 for the longitudinal location of the vehicle relative to the endless track or rail 18. Guide rails 23 are fixed to the floor 11 to provide means to guide the vehicle into washing position and to effect lateral alignment thereof relative to the endless track 18.

Wheel washing units 24, one for each wheel, are mounted on the floor 11 in alignment with each wheel when the vehicle is in washing position relative to the endless track 18. Suitable rotating nozzles 25 are associated with each unit 24 for washing the non-rotating wheels of the vehicle in timed relationship with the washing of the body of the vehicle 20.

A trolley 26 is supported on a series of rollers 27 which roll along the top of the lower flange 28 of the I-beam section forming the endless track 17 and are guided laterally by the vertical web 29. Fixed to the trolley 26 is the bracket 30 upon which is mounted a suitable motor 31 having an output shaft 32 with a suitable pneumatic drive tire 33 engaging the under side of the rail 18 so that when the motor 31 is energized the trolley moves around the endless track 18 in the direction indicated by the arrows 34.

Fixed to the outer ends 35 and 36 of the bracket members 30 and radially inwardly offset from the rail 18 is the vertical nozzle 37 having a series of vertically spaced nozzles 38 spraying against the sides and ends of the vehicle and a horizontal nozzle manifold 39 extending the width of the body above the top of the vehicle having a series of logitudinally spaced nozzles 40 spraying downwardly against the top of the vehicle. It is important to note that the lower ends of the vertical nozzle manifold 37 extends downwardly so as to travel between the wheels of the motor vehicle and the rotating manifolds of the wheel washing units 24, as best seen in FIG. 3, so as to assist these units in the fender and wheel washing operations.

In order to provide a continuous supply of water and washing solution to the nozzle manifolds 37 and 39 there is provided a supply pipe 41 which connects with a vertical line 42 located mid-way between the ends and sides of the endless rail 18. A radially disposed pipe 43 is connected by a swinging coupling 44 to the lower end of the vertical line 42 while the outer end of the pipe 43 is connected by a suitable swinging coupling 45 with the articulated connecting pipe 46. The outer end of the pipe 46 is connected by a swinging coupling 47 to the vertical nozzle manifold 37 and through passageway 48 to the manifold 39. The electric power supply to the motor 31 likewise is provided by the power cord 49 carried on the pipes 43 and 46.

In operation: Referring to the diagram FIG. 5, the driver drives up in his car to the coin meter box 50 and inserts his coin. He then drives forward onto the floor wheel switch 51 which causes stop light 52 to turn on. The undercar spray 53 turns on. The wheel washer units are also energized to wash the stationery wheels 22 of the vehicle. The motor 31 is also energized to cause the spray manifolds 37 and 39 to move around the vehicle spraying hot soapy water, circling the vehicle for the number of cycles programmed in the control panel.

After the prescribed period of time has elapsed, the under car spray 53 turns off, the wheel washers 24 are deenergized, and the hot soapy water is shut off and cold water for the spray manifolds is then turned on, the manifolds rinsing the vehicle during a programmed number of laps therearound. Wax, if selected by the driver, is then injected into the rinse water for a continued number of laps around the vehicle.

Finally, the manifolds are stopped in a clear position and all water shut off, the stop light goes out and the driver then drives his vehicle out of the car wash to complete the job.

While the apparatus herein disclosed and described constitutes a preferred form of the invention, it is also to be understood that the apparatus is capable of mechanical arrangement and commercial adaptation as fall within the scope of the appendent claims are intended to be included herein.

Having thus fully set forth and described this invention what is claimed and desired to be obtained by United States Letters Patent is:

1. A self-service car washing apparatus comprising, in combination:
   (A) a floor arranged to receive a vehicle to be washed including means thereon for longitudinally and laterally positioning the vehicle on said floor;
   (B) an endless track rigidly fixed above said floor and a vehicle positioned thereon to be washed, said endless track generally corresponding to the configuration of but longer and wider than the vehicle to be washed;
   (C) a power-driven trolley operatively mounted on said endless track for movement therearound;
   (D) a spray device for washing the top and sides of the vehicle including a horizontally disposed nozzle manifold extending across the top of the vehicle in vertically spaced relation thereto, and a vertically disposed nozzle manifold extending downwardly along substantially the full height of the sides of the vehicle, said manifolds being mounted on said trolley for movement therewith around said endless track; and
   (E) wheel washers mounted on said floor for washing the stationary wheels of a vehicle while said vertical nozzle manifold on said trolley moves around said vehicle between the sides of said vehicle and said wheel washers to provide fortified wheel washing spray at said wheels.

2. The self-service car washing apparatus defined in claim 1 when said wheel washers comprise a spray bar mounted for rotation in a substantially vertical plane at spaced positions above said floor corresponding generally to, and spaced outwardly from the position of the wheels of a vehicle being washed.

3. The self-service car washing apparatus defined in claim 2 further comprising undercarriage spray means positioned to direct a spray of cleaning fluid upwardly from said floor to clean the undercarriage of a vehicle being washed by said apparatus.

References Cited

UNITED STATES PATENTS

| | | | |
|---|---|---|---|
| 2,896,857 | 7/1959 | Tompkins | 134—123 XR |
| 3,167,797 | 2/1965 | Hergonson | 134—123 XR |
| 3,208,088 | 9/1965 | Sulzberger et al. | 134—123 XR |

OTHER REFERENCES

Thrift-I-Matic, Auto Laundry News, April 1966, p. 8.

ROBERT L. BLEUTGE, *Primary Examiner.*